United States Patent
Roy et al.

(10) Patent No.: US 8,144,613 B2
(45) Date of Patent: Mar. 27, 2012

(54) ACHIEVING QUALITY OF SERVICE IN A WIRELESS LOCAL AREA NETWORK

(75) Inventors: Sumit Roy, Bothell, WA (US); Rohit Gupta, Bellevue, WA (US)

(73) Assignee: Empire Technology Development LLC, Wilmington, DE (US)

( * ) Notice: Subject to any disclaimer, the term of this patent is extended or adjusted under 35 U.S.C. 154(b) by 362 days.

(21) Appl. No.: 12/467,919

(22) Filed: May 18, 2009

(65) Prior Publication Data

US 2010/0290355 A1 Nov. 18, 2010

(51) Int. Cl.
*H04L 12/26* (2006.01)
(52) U.S. Cl. ......... 370/252; 370/230; 370/310; 370/328
(58) Field of Classification Search ............... 370/229, 370/230, 252, 310, 311, 317, 318, 328, 332, 370/465
See application file for complete search history.

(56) References Cited

U.S. PATENT DOCUMENTS

| | | | | |
|---|---|---|---|---|
| 5,220,564 | A * | 6/1993 | Tuch et al. | 370/338 |
| 5,987,333 | A * | 11/1999 | Sole | 455/522 |
| 6,157,616 | A * | 12/2000 | Whitehead | 370/252 |
| 7,756,055 | B2 * | 7/2010 | Hulbert | 370/252 |
| 2005/0129051 | A1 * | 6/2005 | Zhu et al. | 370/445 |
| 2005/0239411 | A1 * | 10/2005 | Hazra et al. | 455/67.11 |
| 2008/0144493 | A1 * | 6/2008 | Yeh | 370/230 |
| 2008/0317155 | A1 * | 12/2008 | Orfanos et al. | 375/267 |
| 2009/0046665 | A1 * | 2/2009 | Robson et al. | 370/332 |
| 2010/0182967 | A1 * | 7/2010 | Zorba Barah et al. | 370/329 |

OTHER PUBLICATIONS

Ad Kamerman, Leo Monteban, WaveLAN-II: A High-Performance Wireless LAN for the Unlicensed Band, AT&T Bell Labs Technical Journal, Summer 1997, pp. 118-133.
John C. Bicket, Bit-rate Selection in Wireless Networks, MS Thesis Computer Science and Engineering, MIT, Feb. 2005, pp. 1-50.
Arunchandar Vasan, Ramachandran Ramjee, Thomas Woo, ECHOS—Enhanced Capacity 802.11 Hotspots, Infocom 2005, 24th Annual Joint Conference of the IEEE Computer and Communications Societies, Mar. 13-17, 2005, pp. 1562-1572, Miami, FL USA,.
Jing Zhu, Xingang Guo, L. Lily Yang, W. Steven Conner, Sumit Roy, Mousumi M. Hazra, Adapting physical carrier sensing to maximize spatial reuse in 802.11 mesh networks, Wireless Communication & Mobile Computing, Dec. 2004, vol. 4 Is. 8, pp. 933-946.
Jing Zhu, Xingang Guo, L. Lily Yang, W. Steven Conner, Leveraging Spatial Reuse in 802.11 Mesh Networks with Enhanced Physical Carrier Sensing, IEEE International Conference on Communications, Jun. 20-24, 2004, vol. 7, pp. 4004-4011, Paris, France.
Hongqiang Zhai, Yuguang Fang, Physical Carrier Sensing and Spatial Reuse in Multirate and Multihop Wireless Ad Hoc Networks, 25th IEEE International Conference on Computer Communications, Apr. 23-29, 2006, pp. 1-12, Barcelona, Spain.
Vivek P. Mhatre, Konstantina Papagiannaki, Optimal Design of High Density 802.11 WLANs, ACM CoNEXT Conference, Oct. 30-Nov. 2, 2006, Singapore.

(Continued)

*Primary Examiner* — Kwang B Yao
*Assistant Examiner* — Nguyen Ngo

(57) ABSTRACT

Examples of achieving quality of service in a wireless local area network via meeting communication channel performance criteria to include a minimum signal-to-noise plus interference ratio and a proportional fairness limit are disclosed.

31 Claims, 9 Drawing Sheets

OTHER PUBLICATIONS

Martin Heusse, Franck Rousseau, Romaric Guilier, Andrzej Duda, Idle Sense: An Optimal Access Method for High Throughput and Fairness in Rate Diverse Wireless LANs, ACM SIGCOMM Computer Communication Review, Oct. 2005, vol. 35 Is. 4, pp. 121-132.

Tarun Josh, Anindo Mukherjee, Younghwan Yoo, Dharma P. Agrawal, Airtime Fairness for IEEE 802.11 Multirate Networks, IEEE Transactions on Mobile Computing, Apr. 2008, vol. 7 Is. 4, pp. 513-527.

Sumit Roy, Hui Ma, Rajiv Vijayakumar, Optimizing 802.11 Wireless Mesh Network Performance Using Physical Carrier Sensing, UWEE Technical Report, Apr. 2006, No. UWEETR-2006-0005.

Rohit Gupta, Tommy Shing, Sumit Roy, Jing Zhu, Closed Loop RF Management Algorithm for Enterprise High Density WLANs, IEEE Globecom, Global Telecommunications Conference, Nov. 26-30, 2007, pp. 4899-4903, Washington, DC, USA.

* cited by examiner

800 A computer program product.

802 A signal bearing medium.

804 instructions for achieving quality of service in a wireless local area network (WLAN) via meeting communication channel performance criteria for the WLAN, which, when executed by logic included in a node coupled to the WLAN causes the logic to:

obtain the communication channel performance criteria for the WLAN, the communication channel performance criteria including a minimum signal-to-noise plus interference ratio (SNIR) for receiving data via the communication channel and a proportional fairness limit for nodes coupled to the WLAN to use the communication channel;

adapt a carrier sense threshold responsive to initiation of a first timing interval, to adapt the carrier sense threshold to include:

measuring a received signal strength from one or more neighboring nodes coupled to the WLAN;

determining a SNIR for the node to receive data via the communication channel based on the measured received signal strength and comparing the determined SNIR with the minimum SNIR;

exchanging with the one or more neighboring nodes information associated with comparing the determined SNIR with the minimum SNIR; or adjusting a value for the carrier sense threshold based on the exchanged information; and adapt a minimum contention window responsive to initiation of a second time interval, wherein adapting the minimum contention window includes adapting the minimum contention window based on the proportional fairness limit for nodes coupled to the WLAN to use the communication channel.

| 806 a computer-readable medium. | 808 a recordable medium. | 810 a communications medium. |

FIG. 8

ACHIEVING QUALITY OF SERVICE IN A WIRELESS LOCAL AREA NETWORK

BACKGROUND

Unless otherwise indicated herein, the approaches described in this section are not prior art to the claims in this application and are not admitted to be prior art by inclusion in this section.

Wireless local area networks (WLANs) are becoming a common way to network or interconnect devices. A WLAN may include interconnected devices or nodes that make up one or more cells. Each cell may include their own network domain with an access point (AP) node via which one or more nodes included in the cell may access the network. Additionally, the nodes in a cell may be mobile and/or fixed in location. Thus, nodes from one cell (including AP nodes) may move to locations that are close (e.g., within a few feet or meters) to other nodes in the same cell or in another cell. These closely spaced nodes, along with their associated APs, may form a dense WLAN configuration. Each node within this dense WLAN configuration may communicate via one or more wireless communication channels. Near simultaneous wireless transmission over these communication channels by nodes in the dense WLAN configuration could interfere with or degrade the quality of the communication channel from the perspective of a node using the communication channel.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 8 illustrates a block diagram of an example computer program product; and

DETAILED DESCRIPTION

Figure 1:
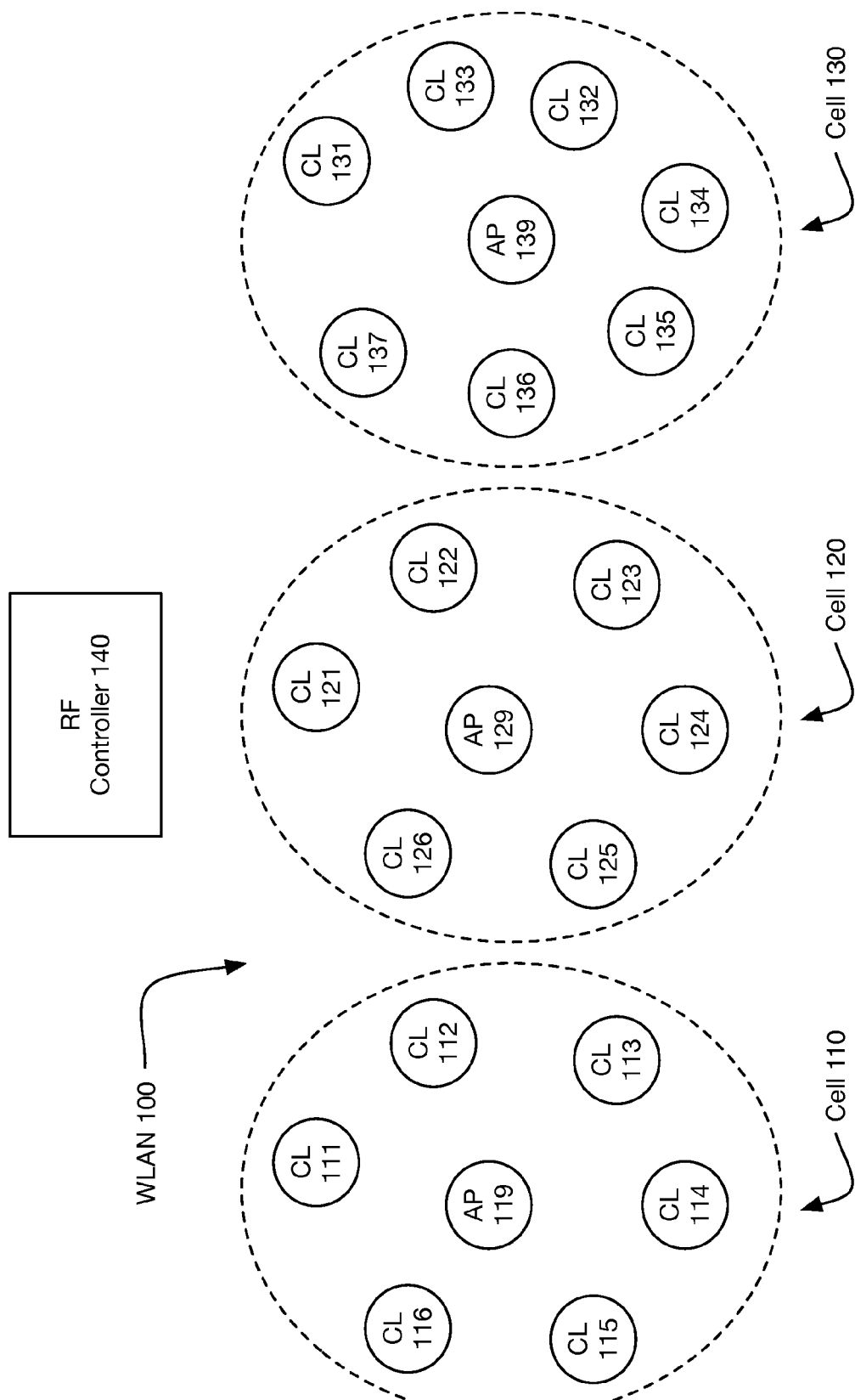
FIG. 1 illustrates an example wireless local area network.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to achieving quality of service in a wireless local area network via meeting communication channel performance criteria.

The present disclosure contemplates that simultaneous wireless transmission over one or more wireless communication channels by nodes in a dense WLAN configuration could interfere with or degrade the quality of one or more communication channels. Simultaneous wireless transmission over one or more wireless communication channels may occur in a type of dense WLAN configuration operated in compliance with the Institute for Electrical Electronic Engineers (IEEE) Standard for Information technology—Telecommunications and information exchange between systems—Local and metropolitan area networks—Specific requirements Part 11: WLAN Media Access Controller (MAC) and Physical Layer (PHY) Specifications, published June 2007, and/or later versions of the standard ("IEEE 802.11"). Each node in this IEEE 802.11 WLAN may include a MAC that uses a carrier sense multiple access with collision avoidance (CSMA/CA) protocol to co-use a communication channel. A MAC using the CSMA/CA protocol may minimize or reduce possible problems with interference.

In one example of a conventional implementation, a MAC using the CSMA/CA protocol may prevent a node from transmitting data (e.g., data packets, requests, responses, etc.) if it is sensed (e.g., at the node's wireless antenna connector) that the communication channel is busy (e.g., being used by another node). Typically, the energy threshold at which a MAC determines a communication channel is busy, herein referred to as "the carrier sense threshold," is set at a level or value that is equal to or just above a value associated with a noise threshold. However, use of a value for a carrier sense threshold that is equal to or just above a value associated with a noise threshold may reduce spatial reuse in a dense WLAN configuration. A reduction in spatial reuse may be problematic in a dense WLAN configuration.

In another example of a conventional implementation, a MAC using the CSMA/CA protocol may employ an access fairness scheme to facilitate a potentially conflict free attempt to use the communication channel once it becomes available again. However, access fairness schemes may fail to account for variable bandwidth capabilities of nodes coupled to a dense WLAN configuration. These variable bandwidth capabilities may be impacted by a node's location relative to its associated AP node and other nodes in its cell or to potentially interfering nodes in neighboring cells. As a result of an access fairness scheme that does not account for variable bandwidth capabilities, nodes having higher bandwidth capabilities may actually have less access fairness than nodes having lower bandwidth capabilities. Less access fairness may be problematic in a dense WLAN configuration.

In some example methods of the present disclosure, at least a portion of a method may be implemented in a node coupled to a WLAN. These example methods, may include obtaining communication channel performance criteria for the WLAN. The criteria may include a minimum signal-to-noise plus interference ratio (SNIR) for receiving data via the communication channel. The criteria may also include a proportional fairness limit for nodes coupled to the WLAN to use the communication channel.

Also, according to some example methods, a carrier sense threshold may be adapted in response to initiation of a first timing interval. Adapting the carrier sense threshold may include measuring a received signal strength from one or more neighboring nodes coupled to the WLAN and determining a SNIR for the node to receive data via the communication channel based on the measured received signal strength. Adapting the carrier sense threshold may further include exchanging with the one or more neighboring nodes information associated with comparing the determined SNIR with the minimum SNIR and adjusting a value for the carrier sense threshold based on the exchanged information. Further, a minimum contention window may be adapted in response to initiation of a second timing interval and may be adapted based on the proportional fairness limit for nodes coupled to the WLAN to use the communication channel.

FIG. 1 illustrates an example WLAN 100. As shown in FIG. 1, WLAN 100 includes cells 110, 120 and 130. In one example, cells 110, 120 and 130 may each include their own network domain with an access point (AP) node such that one or more nodes included in a given cell may wirelessly access WLAN 100. Example AP nodes are depicted in cells 110, 120 and 130 as AP nodes 119, 129 and 139, respectively, although a given cell is not limited to a single AP node. The location of an AP node is depicted in FIG. 1 as being at or near the center of the cell, but an AP node's location is not limited to this location and may be located at any location within the cell.

As shown in FIG. 1, nodes coupled to a WLAN that do not serve as AP nodes for a cell can generally be described as client ("CL") nodes. The CL nodes illustrated in FIG. 1 are but one example of the number, location and spacing of CL nodes that may be included in a cell. In some examples, CL nodes in one cell may migrate to a location within another cell and may then associate with an AP node for that cell.

AP and CL nodes included in cells 110, 120 and 130 may be coupled to WLAN 100 using one or more wireless communication channels. The one or more wireless communication channels may include the use of radio frequencies located within a band of radio frequencies such as 5-gigahertz (GHz) or 2.4-GHz radio frequencies, although this disclosure is not limited to only these bands of radio frequencies. As shown in FIG. 1, WLAN 100 includes radio frequency (RF) controller 140. RF controller 140, as described more below, may distribute or facilitate the distribution of communication channel performance criteria. Communication channel performance criteria may be utilized to enable the nodes in WLAN 100 to use the one or more communication channels in a way that may meet one or more quality of service goals (e.g., high bandwidth, low delay, low packet loss, etc.) on the one or more communication channels.

In some examples, WLAN 100 may be operated in compliance with IEEE 802.11, although this disclosure is not limited to only networks that operate in compliance with IEEE 802.11. Each node in this IEEE 802.11 compliant WLAN 100 may include a MAC that uses a CSMA/CA protocol to co-use a communication channel. As mentioned above, a MAC using the CSMA/CA protocol may prevent a node from transmitting data if it is sensed that the communication channel is busy, e.g., a sensed power or energy level is greater than a value for a carrier sense threshold.

In some examples, CL node 125 included in cell 120 has a MAC using the CSMA/CA protocol to co-use a communication channel to couple to WLAN 100. This co-used communication channel may also be used by neighboring nodes in other cells (e.g., CL node 112 in cell 110). Also, WLAN 100 and/or CL node 125 may have performance criteria to receive data via the communication channel. The performance criteria may include, but is not limited to, an acceptable error rate for the receipt of data (e.g., in data packets). The acceptable error rate may be accomplished by meeting two or more specified conditions. In some examples, the first condition to be met may be that the power of the received signal is above a threshold for which the node can accurately decode data received via the communication channel (herein referred to as the "receiver threshold"). In some examples, the second condition to be met may be that a SNIR to receive data is above a given value (e.g., a minimum SNIR) in the presence of transmissions from other co-users of the communication channel and/or in the presence of other types of interference.

In some examples, CL node 125 may sample the power level on the co-used communication channel and its MAC may only allow a data transmission if the sensed power level is below a given value for a carrier sense threshold. Also, CL node 125 may have a value for a receiver threshold to receive data on the co-used communication channel. The values for the carrier sense and receiver thresholds may be expressed in decibels relative to one milliwatt (dBm). As described more below, the carrier sense threshold and the receiver threshold for CL node 125 may be adapted to meet communication channel performance criteria that may include the two conditions mentioned above, or other performance criteria as may be desired in a particular implementation.

Additional communication channel performance criteria may be utilized in some implementations. For example, a proportional fairness limit for nodes coupled to WLAN 100 to co-use the communication channel. The proportional fairness limit may be utilized to ensure that nodes coupled to WLAN 100 receive a fair share of the network throughput proportional to their bandwidth capabilities, e.g., the data rate at which a node can transmit and/or receive data with acceptable error rates.

As previously mentioned, CL node 125 may sense (e.g., sample) the energy level on the co-used communication channel. The MAC for CL node 125 may be configured to only allow a data transmission if the sensed energy level is below a given value for a carrier sense threshold. CL node 125's MAC may be configured to employ a scheme to facilitate a potentially conflict free attempt to use the communication channel once it becomes available again. For example, one scheme may include the use of a minimum time period or interval for which CL node 125 is prevented from another attempt to use the communication channel. For this example, the minimum time period is herein referred to as a "minimum contention window". In some examples, the minimum contention window may be adapted based on an additional communication channel criteria that includes the proportional fairness limit.

Figure 2:
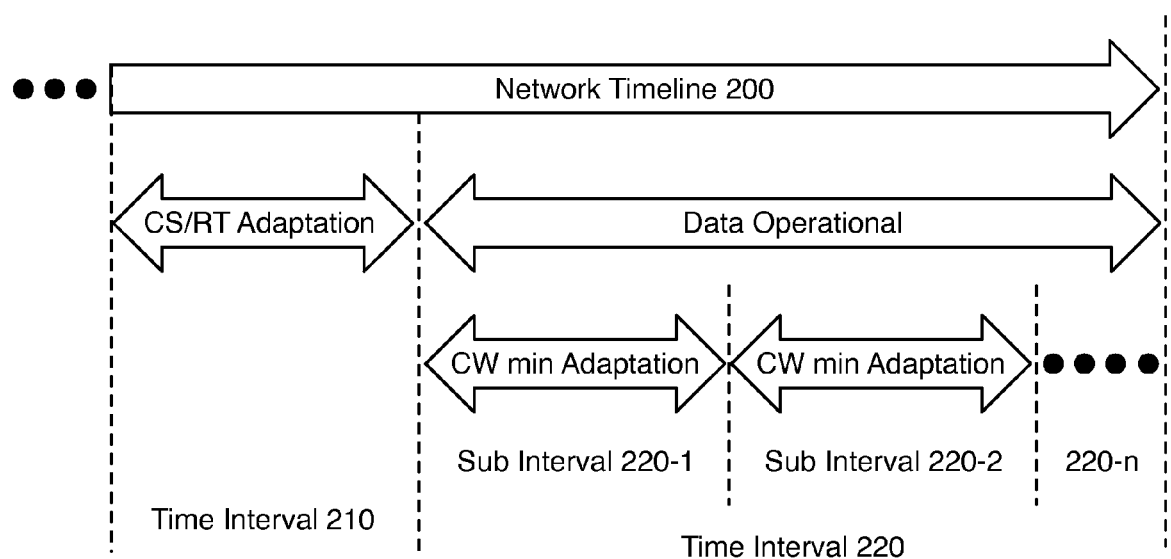
FIG. 2 illustrates an example network timeline for the wireless local area network.

FIG. 2 illustrates an example network timeline 200 for WLAN 100. As illustrated in FIG. 2, network timeline 200 includes time intervals 210 and 220. As described more below, time interval 210 illustrates a period of time over which a MAC for a node may adapt a carrier sense (CS) threshold and a receiver threshold (RT) based on meeting communication channel performance criteria (i.e., CS/RT Adaptation). Time interval 220 illustrates a period of time over which data may be exchanged between nodes in WLAN 100 using the values for the carrier sense and the receiver threshold adapted during time interval 210. Time interval 220, may also include subintervals 220-1 to 220-n. Each subinterval may include a time period for adapting the minimum contention window (i.e. CW min Adaptation) of a node based on at least a portion of the communication channel performance criteria (e.g., proportional fairness limit). Although sub-intervals 220-1 through 220-n are illustrated as sequentially occurring intervals, the sub-intervals may overlap in time in some example implementations, or occur in parallel with one another in other example implementations.

In some examples, in addition to operating in compliance with IEEE 802.11, RF controller 140 may also operate in compliance with an amendment to IEEE 802.11. This amendment may be IEEE 802.11k. See IEEE 802.11k-2008: IEEE Standard for Information technology—Telecommunications and information exchange between systems—Local and metropolitan area networks—Specific requirements Part 11: WLAN MAC and PHY Specifications, Amendment 1: Radio Resource Measurement of Wireless LANs, published June 2008, and/or later versions of this amendment to IEEE 802.11. In such examples, RC controller 140 may initiate time interval 210 by directing the nodes coupled to WLAN 100 (e.g., via a broadcasted message routed through each cell's AP node) to collect received signal strength indicator (RSSI) measurements.

In some examples, RC controller 140 may also distribute communication channel performance criteria to the nodes coupled to WLAN 100, e.g., via a broadcasted message. Thus, each node is able to obtain the performance criteria prior to or at the time of the initiation of time interval 210. The performance criteria may include a minimum SNIR for a node to receive data via the communication channel. Responsive to the initiation of time interval 210, the nodes coupled to WLAN 100 may then adapt their respective carrier sense and receiver thresholds.

Using CL node 125's actions during time interval 210 as an example, CL node 125 may lower both values for carrier sense and receiver thresholds to a level just above a value for its default noise threshold (e.g., a power level that may match noise power levels for circuitry resident on CL node 125). CL node 125 may then measure the strength of received signals from one or more neighboring nodes coupled to WLAN 100 (e.g., via receipt of beacon messages forwarded from the nodes). CL node 125 may then determine whether strength of a received signal from one node coupled to WLAN 100 is strong enough to negatively impact the received signal from another node also coupled to WLAN 100. In other words, CL node 125 cannot meet the minimum SNIR for receiving data from a first node coupled to WLAN 100 if a second node coupled to WLAN 100 is also transmitting on the communication channel. Other nodes coupled to WLAN 100 may also make the same determination and indicate to CL node 125 that they can't meet the minimum SNIR if CL node 125 is also transmitting on or co-using the communication channel. CL node 125 may exchange information associated with these determinations of whether the minimum SNIR can be met. Exchanged information may include indications of whether co-use of the communication channel negatively impacts meeting the minimum SNIR from either the perspective of CL node 125 or from the perspective of other nodes coupled to WLAN 100. The information may be exchanged between CL node 125 and other nodes coupled to WLAN 100 via RF controller 140, although this disclosure is not limited to only exchanging the information via RF controller 140.

In some examples, CL node 125 is configured to adjust a value for carrier sense threshold based on the exchanged information. CL node 111 of cell 110 may indicate in exchanged information that CL node 125's co-use of the communication channel causes CL node 111 to not meet the minimum SNIR requirements for receiving data from the AP node included in the cell to which CL node 111 is associated with (e.g., AP node 119). By adjusting the value of the carrier sense threshold to a level associated with the appropriate SNIR requirements, the MAC for CL node 125 can be configured to prevent transmitting when the communication channel is sensed as in use by CL node 111.

In some examples, without considering co-use of the communication channel, CL node 125 may be configured to adjust a receiver threshold value such that a minimum SNIR for receiving data via the communication channel is met. CL node 125, based on a SNIR determined from the detected received signal strengths, may be configured to compare a determined SNIR to the minimum required SNIR. CL node 125 may also be configured to adjust the receiver threshold value based on the comparison. For example, as shown in FIG. 1, AP node 139 is an AP for cell 130. CL node 125 could possibly access WLAN 100 via AP node 139. But a SNIR for a detected signal received from AP node 139 may fail to meet the minimum SNIR. Since the communication performance criteria is not met, CL node 125 may then raise the receiver threshold value so that sensed signals received from AP node 139 are ignored or not acted upon when received. In one example alternative, CL node 125 may reduce its bandwidth capabilities to a level that may result in a SNIR that meets the minimum required SNIR. In this example alternative, CL node 125 could adjust the receiver threshold value so that sensed signals received are not ignored.

In some examples, time interval 210 lasts for a sufficient period of time to allow the nodes coupled to WLAN 100 to accurately measure each others received signal strengths, exchange information associated with those measurements and adjust values for receiver and carrier sense thresholds accordingly.

In some examples, RC controller 140 distributes communication channel performance criteria to each of the nodes coupled to WLAN 100. The communication channel performance criteria may include a proportional fairness limit to transmit data via the communication channel. Following the ending of time interval 210, the nodes coupled to WLAN 100 may each adjust their minimum contention windows based on the proportional fairness limit.

As mentioned previously, the proportional fairness limit may be used to ensure that nodes coupled to WLAN 100 receive a fair share of the network throughput proportional to their bandwidth capabilities. So, in one example, CL node 125 may have a bandwidth capability that is about nine (9) megabits per second (Mbps). CL node 125 may compare this bandwidth capability to the bandwidth capability indicated by other nodes coupled to WLAN 100, e.g., via messages forwarded through AP node 119 and/or through RF controller 140. If the other nodes indicate an average bandwidth capability of 18 Mbps, then CL node 125's bandwidth capability is 50% of that of the other nodes. CL node 125 may then adjust the minimum contention window for CL node to be 50% smaller. As a result of the adjustment, CL node 125 may theoretically double the rate at which it reattempts a use of the communication channel. Because of this adjustment, CL node 125 can be configured to have a minimum contention window that fairly reflects its bandwidth capabilities as compared to other nodes coupled to WLAN 100.

In some examples, RF controller 140 collects and disseminates the network throughput capabilities of nodes coupled to WLAN 100. RF controller 140 can also set an initial minimum contention window for each of the nodes coupled to WLAN 100. The nodes may then each adjust this disseminated minimum contention window requirement to meet the proportional fairness limit as described above.

As shown in FIG. 2, time interval 220 includes subintervals 220-1 to 220-n. These subintervals may be based on maintaining a minimum contention window that accurately reflects the possibly changing bandwidth capabilities of nodes coupled to WLAN 100. For example, during a given subinterval, a source of interference that impacts a node's bandwidth capabilities may be removed or added to an area surrounding the node. At the beginning of a subsequent subinterval, a new minimum contention window can be adapted to reflect the impact on the node's bandwidth capabilities. In another example, RF controller 140 may periodically indicate (e.g., via broadcast messages) to the nodes coupled to WLAN 100 that bandwidth capabilities for one or more nodes have changed. Consequently, at subsequent subintervals new minimum contention windows may be adapted.

In some examples, subsequent subintervals may occur at either fixed or variable time intervals. Variable time intervals may vary due to activity levels of nodes coupled to WLAN 100. So during peak activity levels (e.g., during peak business hours), the variable time intervals may be relatively shorter periods of time as compared to during low activity levels (e.g., before/after peak business hours).

Figure 3:
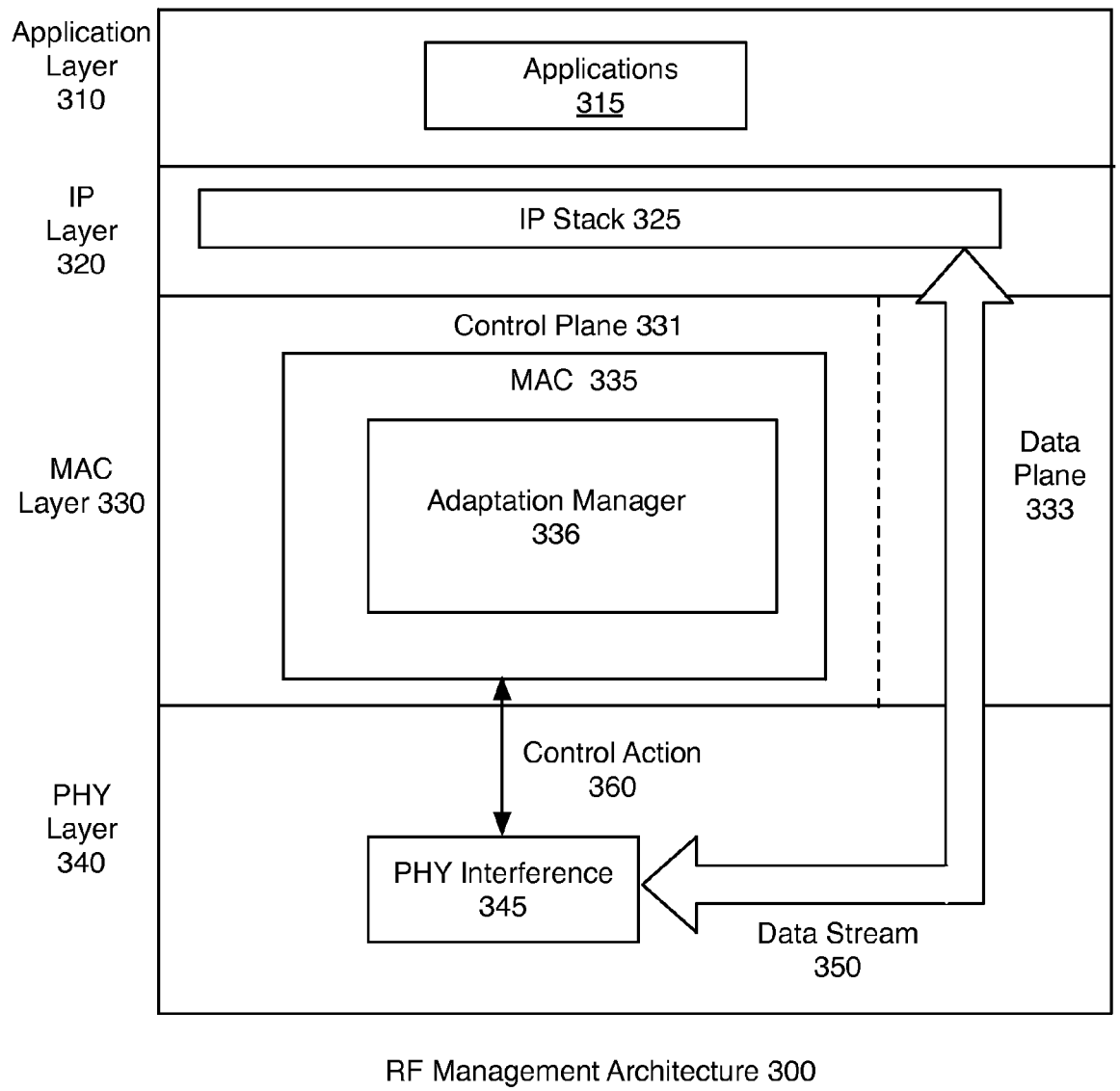
FIG. 3 illustrates a block diagram of an example architecture for radio frequency management at a node coupled to the wireless local area network.

FIG. 3 provides a block diagram of an example architecture for radio frequency management at a node coupled to a WLAN (e.g., WLAN 100). As shown in FIG. 3, this example architecture is depicted as RF management architecture 300. RF management architecture 300 may include application layer 310, Internet protocol (IP) layer 320, MAC layer 330 and PHY layer 340. Layers 310, 320, 330 and 340 illustrate how a data stream 350 may move through elements included in these layers based on a control action 360.

In some examples, PHY layer 340 includes PHY interface 345 and MAC Layer 330 includes control plane 331, data plane 333 and MAC 335. MAC 335 may include elements such as an adaptation manager 336 (described more below) that may influence or cause control action 360. For example, logic included in adaptation manager 336 may measure received signal strengths, exchange measured information with other nodes, adapt carrier sense and receiver thresholds and adapt a minimum contention window. The resulting control action 360 may include the permitting, blocking or ignoring of a data stream that is received or transmitted by a node. If control action 360 includes ignoring or blocking a data stream, elements in MAC layer 330 (e.g., MAC 335), IP layer 320 (e.g., IP stack 325) and application layer 310 (e.g., applications 315) may take no action. If control action 360 includes permitting a data stream, elements in MAC layer 330, IP layer 320 and application layer 310 may take necessary actions to process the data stream (e.g., encode/decode, encapsulate/de-encapsulate, etc.).

Figure 4:
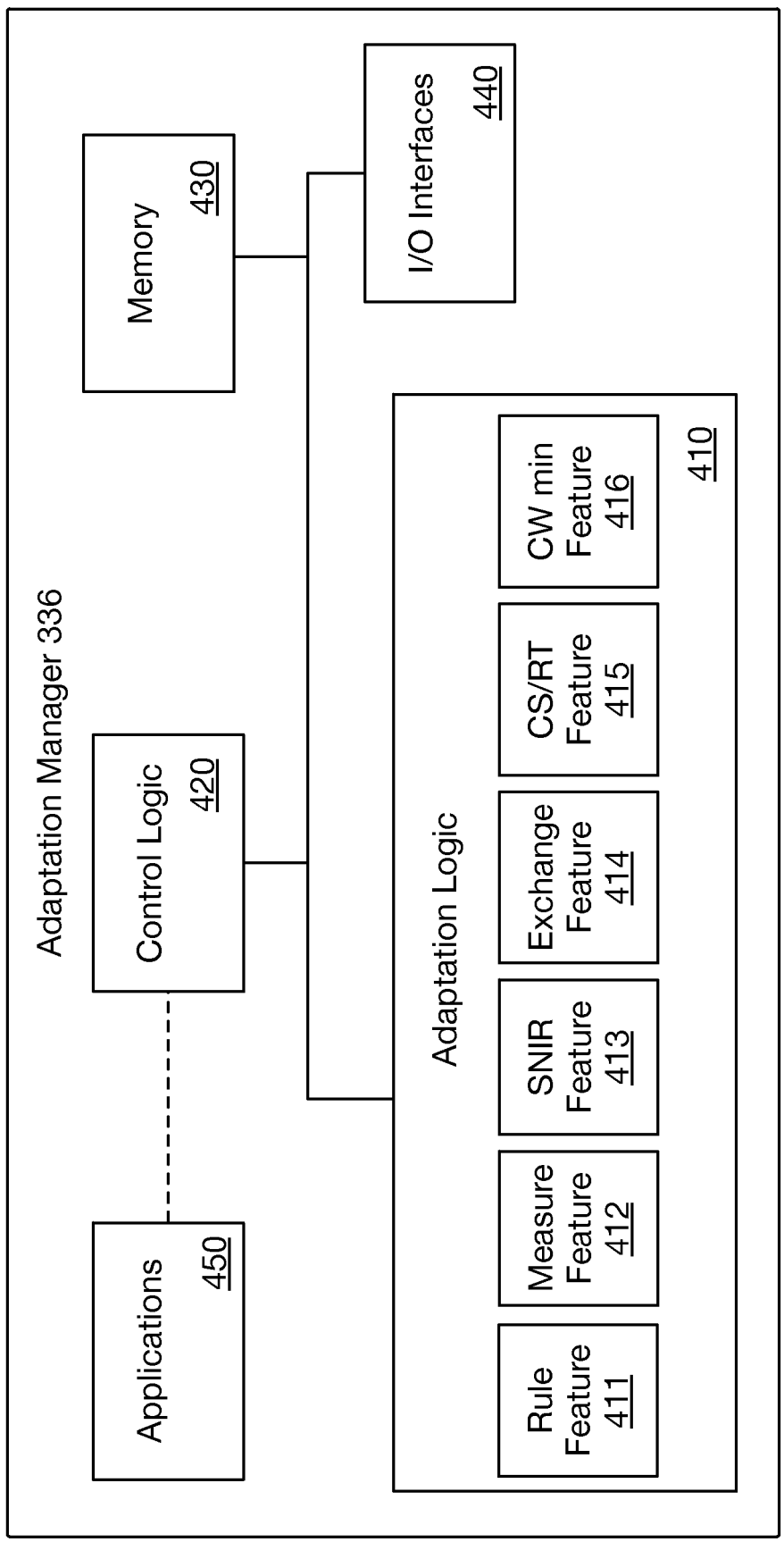
FIG. 4 illustrates a block diagram of an example architecture for an adaptation manager.

FIG. 4 illustrates a block diagram of an example architecture for adaptation manager 336. As mentioned above for FIG. 3, MAC controller 335 of RF management architecture 300 may include adaptation manager 336. In some examples, adaptation manager 336 includes features and/or logic configured or arranged to adapt a carrier sense (CS) and a receiver threshold (RT) or a minimum contention window for a node coupled to a WLAN.

The example adaptation manager 336 of FIG. 4 includes adaptation logic 410, control logic 420, memory 430, input/output (I/O) interfaces 440 and optionally one or more applications 450. As illustrated in FIG. 4, adaptation logic 410 is coupled to control logic 420, memory 430 and I/O interfaces 440. Also illustrated in FIG. 4, the optional applications 450 are arranged in cooperation with control logic 420. Adaptation logic 410 may further include one or more of a rule feature 411, measure feature 412, SNIR feature 413, exchange feature 414, CS/RT feature 415 and a CW min feature 416, or any reasonable combination thereof.

In some examples, the elements portrayed in FIG. 4's block diagram are configured to support or enable adaptation manager 336 as described in this disclosure. A given adaptation manager 336 may include some, all or more elements than those depicted in FIG. 4. For example, adaptation logic 410 and control logic 420 may separately or collectively represent a wide variety of logic device(s) to implement the features of adaptation manager 336. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 4, adaptation logic 410 includes rule feature 411, measure feature 412, SNIR feature 413, exchange feature 414, CS/RT feature 415 and CWmin feature 416. Adaptation logic 410 may be configured to use one or more of these features to perform operations. As described in more detail below, example operations may include one or more of obtaining communication channel performance criteria for a WLAN (e.g., WLAN 100), adapting a carrier sense and a receiver threshold, and adapting a minimum contention window to meet the communication channel performance criteria.

In some examples, control logic 420 may be configured to control the overall operation of adaptation manager 336. As mentioned above, control logic 420 may represent any of a wide variety of logic device(s)). The wide variety of logic device(s) may be configured to operate in conjunction with executable content or instructions to implement the control of adaptation manager 336. In some alternate examples, the features and functionality of control logic 420 may be implemented within adaptation logic 410.

According to some examples, memory 430 is arranged to store executable content or instructions. The executable content or instructions may be used by control logic 420 and/or adaptation logic 410 to implement or activate features or elements of adaptation manager 336. Memory 430 may also temporarily maintain communication channel criteria and/or measurement data obtained by adaptation logic 410's features. Memory 430 may also at least temporarily maintain bandwidth capabilities of other nodes coupled to a WLAN to enable adaptation manager 336's logic to determine a minimum contention window to meet communication performance criteria such as a proportional fairness limit.

Memory 430 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 440 may provide an interface via an internal communication medium or link (not shown) between adaptation manager 336 and elements resident on or located with a node. I/O interfaces 440 may include interfaces that operate according to various communication protocols (e.g., Peripheral Component Interconnect (PCI), PCI-Express (PCIe), Inter-Integrated Circuit (I²C), System Management Bus (SMBus), Serial Peripheral Interface Bus (SPI), etc.) to communicate over the internal communication link.

In some examples, adaptation manager 336 includes one or more applications 450 to provide instructions to control logic 420 and/or adaptation logic 410.

Figure 5:
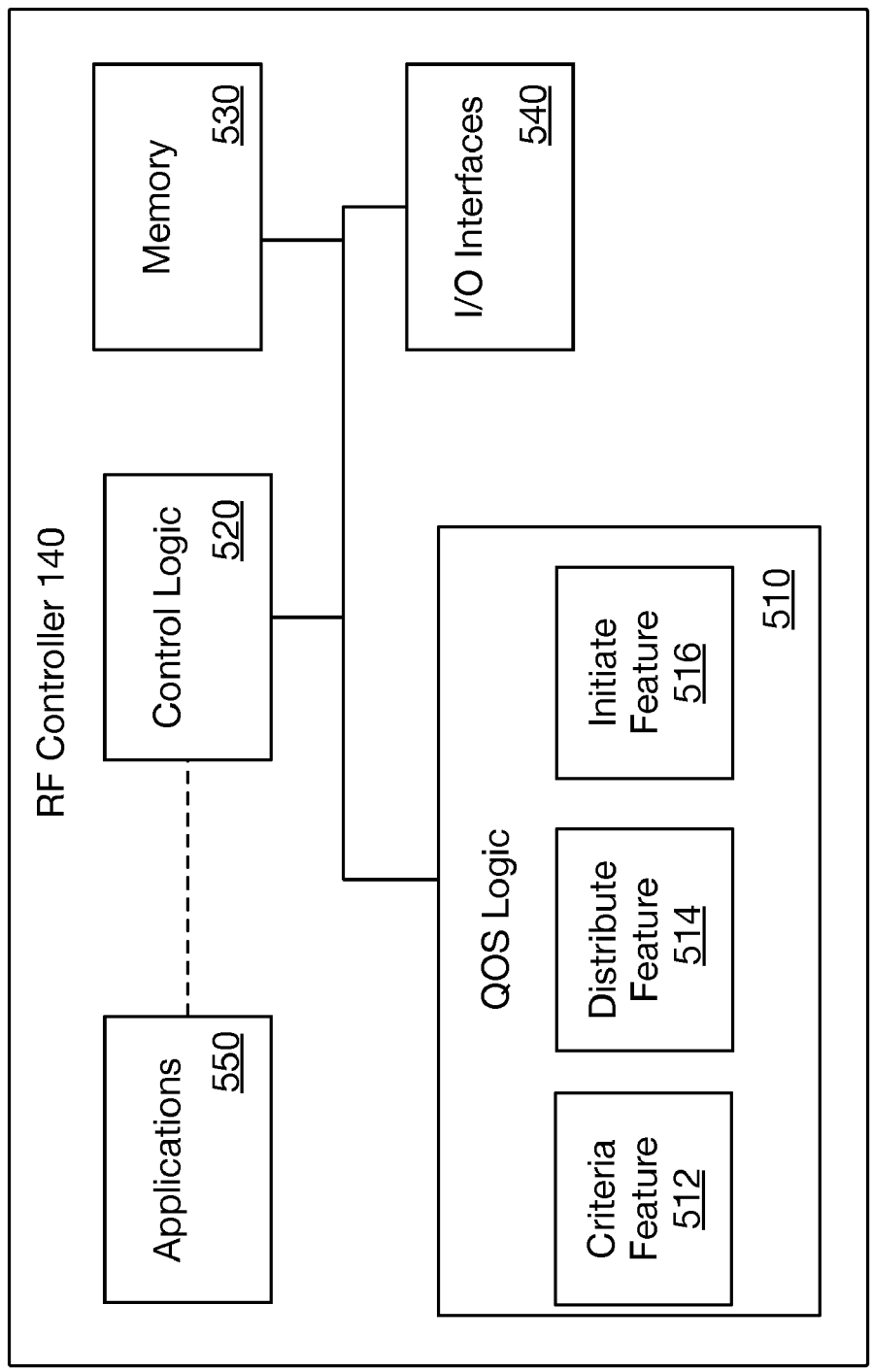
FIG. 5 illustrates a block diagram of an example architecture for a radio frequency controller.

FIG. 5 illustrates a block diagram of an example architecture for RF controller 140. As mentioned above for FIG. 1, WLAN 100 may include RF controller 140 that includes features and/or logic configured or arranged to distribute or facilitate the distribution of communication channel performance criteria for WLAN 100 and to possibly initiate network time intervals.

In FIG. 5, RF controller 140's example architecture includes quality of service (QoS) logic 510, control logic 520, memory 530, input/output (I/O) interfaces 540 and optionally one or more applications 550. As illustrated in FIG. 5, QoS logic 510 is coupled to control logic 520, memory 530 and I/O interfaces 540. Also illustrated in FIG. 5, the optional applications 550 are arranged in cooperation with control logic 520. QoS logic 510 may further include one or more of a criteria feature 512, a distribute feature 514 and a distribute feature 516, or any reasonable combination thereof.

In some examples, the elements portrayed in FIG. 5's block diagram are those elements to support or enable RF controller 140 as described in this disclosure. However, a given RF controller implementation may include some, all or more elements than those depicted in FIG. 5. For example, QoS logic 510 and control logic 520 may separately or collectively represent a wide variety of logic device(s) to implement the features of RF controller 140. As mentioned previously, an example logic device may include one or more of a computer, a microprocessor, a microcontroller, an FPGA, an ASIC, a sequestered thread or a core of a multi-core/multi-threaded microprocessor or a combination thereof.

In some examples, as shown in FIG. 5, QoS logic 510 includes criteria feature 512, distribute feature 514 and initiate feature 516. QoS logic 510 may be configured to use one or more of these features to perform operations. As described in more detail below, example operations may include one or more of maintaining communication channel performance criteria for WLAN 100, and distributing communication channel performance criteria, and possibly distributing other information (e.g., exchanged measurement information) to one or more nodes coupled to WLAN 100. The operations may also include initiation of network time intervals as mentioned for FIG. 2.

In some examples, control logic 520 may be configured to control the overall operation of RF controller 140 and as mentioned above, may represent any of a wide variety of logic device(s). The wide variety of logic device(s) may be configured to operate in conjunction with or executable content or instructions to implement the control of RF controller 140. In alternate examples, the features and functionality of control logic 520 may be implemented within QoS logic 510.

According to some examples, memory 530 is arranged to store executable content or instructions. The executable content or instructions may be used by control logic 520 and/or QoS logic 510 to implement or activate features or elements of RF controller 140. Memory 530 may at least temporarily maintain communication channel performance criteria for WLAN 100 as well as individual node bandwidth capabilities. Memory 530 may also at least temporarily maintain information exchanged between nodes that are associated with measured received signal strengths at the nodes coupled to WLAN 100.

Memory 530, for example, may include a wide variety of memory media including, but not limited to, one or more of volatile memory, non-volatile memory, flash memory, programmable variables or states, RAM, ROM, or other static or dynamic storage media.

In some examples, I/O interfaces 540 may provide an interface between RF controller 140 and elements coupled to WLAN 100 (e.g., nodes depicted in FIG. 1). I/O interfaces 540 may include an interface that operates according to various communication protocols (e.g., IEEE 802.11 and/or amendments to IEEE 802.11), which may allow RF controller 140 to communicate over one or more communication channels that are coupled to WLAN 100.

In some examples, RF controller 140 includes one or more applications 550 to provide instructions to control logic 520 and/or QoS logic 510.

Figure 6:
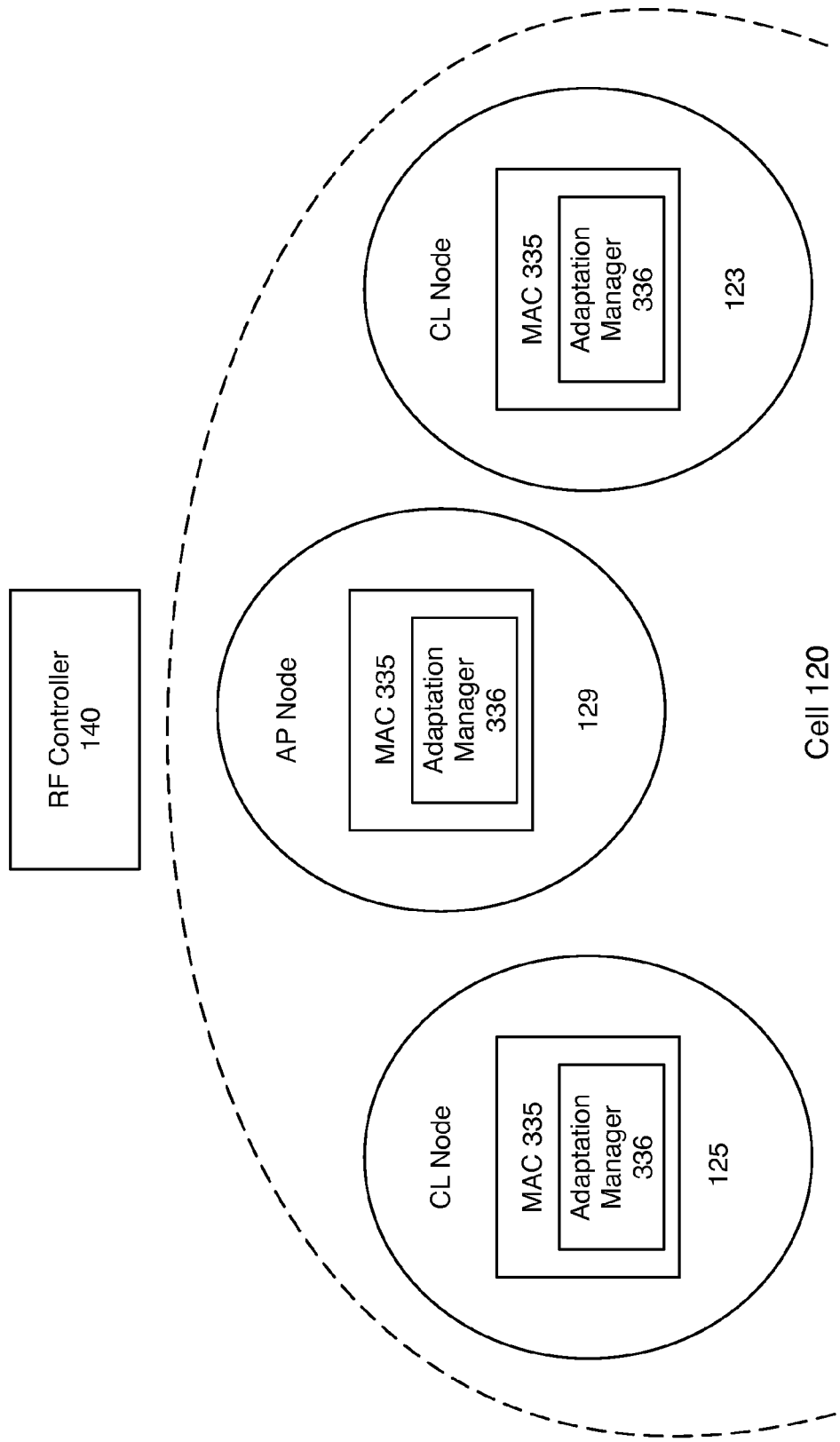
FIG. 6 illustrates a block diagram illustrating additional aspects of the example wireless local area network

FIG. 6 illustrates a block diagram illustrating additional aspects of example WLAN 100 depicted in FIG. 1 and described above. A portion of the nodes included in cell 120 are also illustrated in FIG. 6. Also shown in FIG. 6 is RF controller 140. Example nodes 123, 125 and 129 are depicted with node 129 serving as the AP node for cell 120 and nodes 123 and 125 acting as clients (CLs). Each node depicted also includes a MAC 335 having an adaptation manager 336.

As mentioned previously, RF controller 140 includes logic (e.g., QoS logic 510 and/or control logic 520) that is configured to maintain communication channel performance criteria for WLAN 100, distribute that communication channel performance criteria and possibly distribute other information to one or more nodes coupled to WLAN 100. Also as mentioned previously, adaptation manager 336 includes logic (e.g., adaptation logic 410 and/or control logic 420) that is configured to obtain communication channel performance criteria for a WLAN, adapt carrier sense and receiver thresholds and adapt a minimum contention window to meet the communication channel performance criteria.

In some examples, nodes 123, 125 and 129 each implement the RF management architecture 300 described for FIG. 3, where RF controller 140 is arranged to distribute communication criteria to nodes 123, 125 and 129. The communication channel criteria may include a minimum SNIR for the communication channel, and a proportional fairness limit for nodes coupled to WLAN 100 to use the communication channel. An initial distribution of the communication channel criteria may also include an initiation of a first time interval (e.g., time interval 210). In some examples, the initiation of the first time interval may serve as a beginning of a process such as CS/RT adaptation.

In some examples, CL node 125 having a MAC 325 that includes logic to obtain the communication channel performance criteria and, responsive to the first time interval, adapts a carrier sense (CS) and a receiver threshold (RT) based on the minimum SNIR and information exchanged with other nodes coupled to WLAN 100. RF controller 140 may then initiate a second time interval (e.g., time interval 220) to indicate a beginning of another process. In some examples this other process may include adapting a minimum contention window. CL node 125, responsive to initiation of the second time interval, may then adapt a minimum contention window based on the proportional fairness limit criteria. Also, and as described above, CL node 125 may further adapt the minimum contention window during subintervals included in the second time interval. In some examples, subintervals included in the second time interval are fixed periods of time for which CL node 125 is configured to adapt its minimum contention window. In other examples, subintervals included in the second time interval are variable periods of time that may vary based on activity levels of WLAN (e.g., shorter periods during peak activity and longer periods during low activity).

Figure 7:
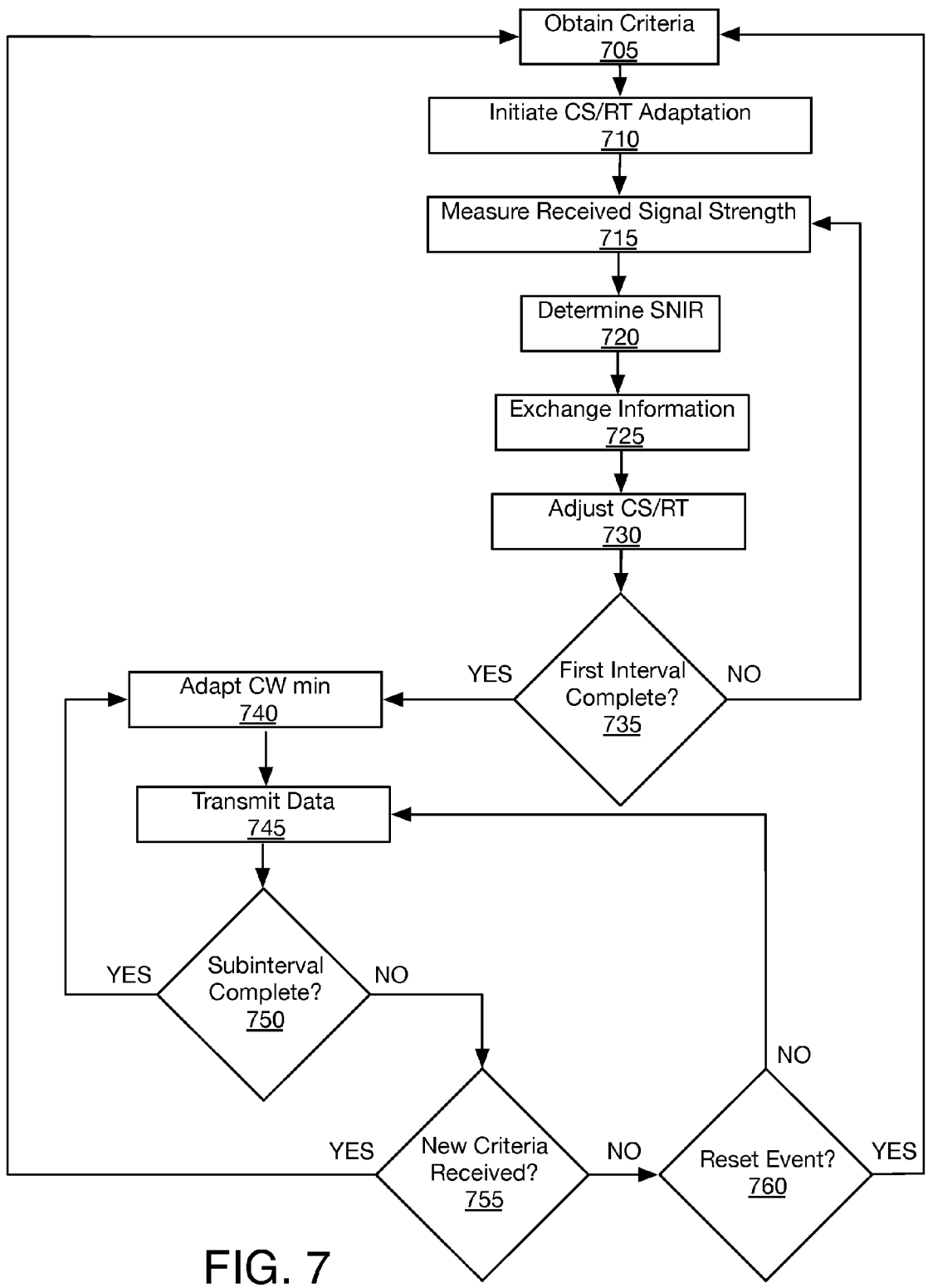
FIG. 7 illustrates a flow chart of an example method for radio frequency management at a node coupled to the wireless local area network.

FIG. 7 illustrates a flow chart of an example method for radio frequency management at a node coupled to a WLAN. In some examples, WLAN 100, as shown in FIG. 1, and a node including a MAC having an adaptation manager as shown in FIGS. 3 and 4, is used to illustrate example methods. But the described methods are not limited to an implementation on WLAN 100 as shown in FIG. 1 or to a node including a MAC having an adaptation manager as shown in FIGS. 3 and 4. The methods may be implemented on other WLANs that may include nodes with MACs having one or more of the elements depicted in FIGS. 1, 3 and 4.

Processing begins at block 705 (Obtain Criteria), where communication channel criteria are obtained, for example, by rule feature 411 of adaptation manager 336. The communication channel criteria may include a minimum SNIR and a proportional fairness limit. Rule feature 411 may at least temporarily store the communication channel criteria in a memory (e.g., memory 430).

Processing continues from block 705 to block 710 (Initiate CS/RT Adaptation), where a first time interval (e.g., time interval 210) is initiated (e.g., by RF controller 140). The first time interval may be initiated for adaptation of the carrier sense (CS) threshold and a receiver threshold (RT) based on the obtained criteria from block 705. The adaptation process continues over blocks 715, 720, 725, 730, and decision block 735, which are all included within the first time interval.

Continuing from block 710 to block 715 (Measure Received Signal Strength), the received signal strengths from one or more neighboring nodes coupled to WLAN 100 are measured (e.g., by measure feature 412). The measured received signal strengths may be at least temporarily stored in a memory (e.g. memory 430).

Moving from block 715 to block 720 (Determine SNIR), the measured received signal strengths and the communication channel criteria obtained from blocks 705 and 715 are evaluated (e.g., via SNIR feature 413) to determine whether the minimum SNIR can be met for receiving data via a co-used communication channel. The results of this determination may be at least temporarily stored in a memory (e.g., memory 430).

Continuing from block 720 to block 725 (Exchange Information), the results of the determination of whether the minimum SNIR was met from block 720 are exchanged (e.g., via exchange feature 414) with another node to indicate whether co-use of the communication channel negatively impacts meeting the minimum SNIR for the communication channel. RF controller 140 may be employed to facilitate this exchange of information. The exchanged information may be at least temporarily stored in a memory (e.g., memory 430).

Proceeding from block 725 to block 730 (Adjust CS/RT), the measured received signal strengths and the exchanged information from blocks 715 through 725 are obtained and a value for a carrier sense (CS) threshold is adjusted (e.g., via CS/RT feature 415) based on the exchanged information. A receiver threshold (RT) may also be adjusted (e.g., via CS/RT feature 415) based on the measured received signal strengths.

Continuing from block 730 to decision block 735 (First Interval Complete?), the process determines (e.g., via adaptation manager 336) whether the first time interval is over or complete. Processing continues from decision block 735 to block 740 when the first interval is complete. Otherwise, processing continues from decision block 735 to block 715 when the first time interval is not complete.

In block 740 (Adapt CW Min), a second time interval is initiated for adaptation of the minimum contention window (CW min). In some examples, CWmin feature 416 may be employed to adapt a minimum contention window based on the proportional fairness limit for nodes coupled to WLAN 100.

Continuing from block 740 to block 745 (Transmit Data), data is exchanged or transmitted on the communication channel coupled to WLAN 100 using the carrier sense (CS) threshold and/or the receiver threshold (RT) adapted in blocks 715 through 730 and the minimum contention window adapted in block 740.

Proceeding from block 745 to decision block 750 (Subinterval Complete?), the process determines (e.g., via adaptation manager 336) whether a currently selected subinterval (e.g., first subinterval, second subinterval, etc.) included in the second time interval is complete. Processing continues from decision block 750 to block 740 when additional processing is required for the adaptation of the minimum contention window (CW min) for each subinterval. Otherwise, processing continues from decision block 750 to decision block 755 when processing for all subintervals in the second interval are complete.

In decision block 755 (New Criteria Received?), the process determines (e.g., via adaptation manager 336) whether new or updated communication channel criteria have been received (e.g., from RF controller 140). Processing continues from decision block 755 to block 705 when updated or new communication channel criteria have been received. Otherwise, processing continues from decision block 755 to block 760 when no additional criteria are received.

In decision block 760 (Reset Event), the process determines (e.g., via adaptation manager 336) whether a reset event has occurred. In some examples, a reset event may be caused by a node powering down, (e.g., coming in and out of a power saving mode or restarting after a complete power down). In some other examples, a reset event may be caused by a decoupling of the node from WLAN 100 (e.g., loses communication with an AP node for WLAN 100). Processing continues from decision block 760 to block 705 when a reset event has occurred. Otherwise, processing continues from decision block 760 to block 745 when no reset event has occurred.

FIG. 8 illustrates a block diagram of an example computer program product 800. In one embodiment, as shown in FIG. 8, computer program product 800 includes a signal bearing medium 802 that may also include instructions 804. In some examples, instructions 804 for achieving quality of service in a wireless local area network (WLAN) via meeting communication channel performance criteria for the WLAN, which when executed by a computer or logic included in a node coupled to a WLAN, cause the computer or logic to obtain the communication channel performance criteria for the WLAN. The criteria may include a minimum SNIR for receiving data via the communication channel, and a proportional fairness limit for nodes coupled to the WLAN to use the communication channel. Instructions 804 may further cause the computer or logic to adapt a carrier sense threshold in response to initiation of a first time interval. Adapting the carrier sense threshold may include measuring a received signal strength from one or more neighboring nodes coupled to the WLAN and determining a SNIR for the node to receive data via the communication channel based on the measured received signal strength. Adapting the carrier sense threshold may further include exchanging with the one or more neighboring nodes information associated with comparing the determined SNIR with the minimum SNIR and adjusting a value for the carrier sense threshold based on the exchanged information. Instruction 804 may also cause the computer or logic to adapt a minimum contention window in response to initiation of a second timing interval. The minimum contention window may be adapted based on the proportional fairness limit for nodes coupled to the WLAN to use the communication channel.

Also depicted in FIG. 8, some embodiments may include one or more of a computer readable medium 806, a recordable medium 808 or a communications medium 810. The dotted boxes around these elements depict different types of mediums included within, but not limited to, signal bearing medium 802. These types of mediums may distribute instruction 804 to be executed by a computer or logic included in a node. Computer readable medium 806 and recordable medium 808 may include, but are not limited to, a flexible disk, a hard disk drive (HDD), a Compact Disc (CD), a Digital Video Disk (DVD), a digital tape, a computer memory, etc. Communications medium 810 may include, but is not limited to, a digital and/or an analog communication medium (e.g., a fiber optic cable, a waveguide, a wired communication link, a wireless communication link, etc.).

Figure 9:
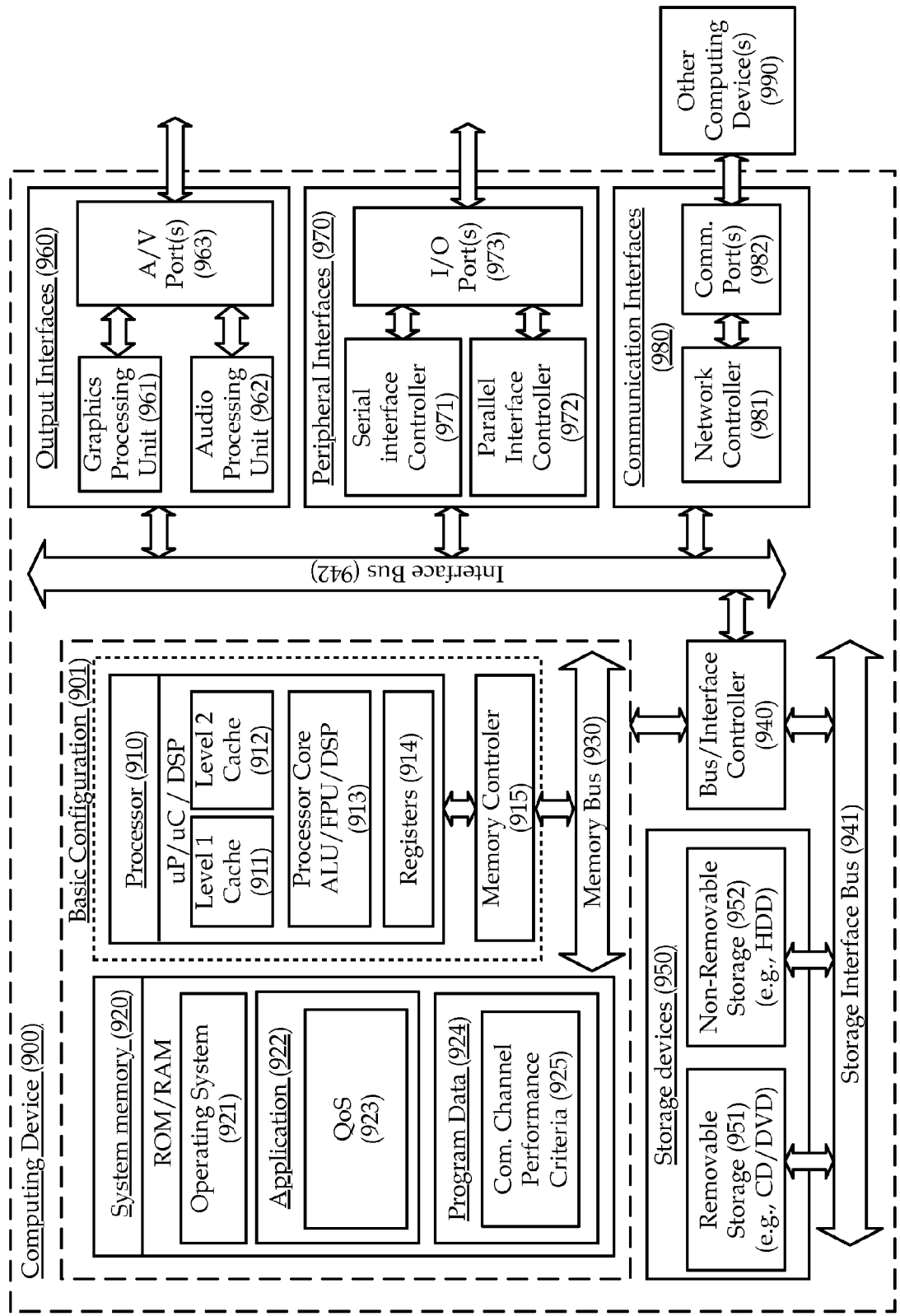
FIG. 9 illustrates an example computing device, all arranged in accordance with the present disclosure.

FIG. 9 is a block diagram illustrating an example computing device 900 that is arranged for meeting communication channel performance criteria in accordance with the present disclosure. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 can include one or more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a quality of service (QoS) algorithm 923 that is arranged to perform the functions as described herein including the actions described with respect to the flow chart shown in FIG. 7 or to the functions described for adaptation manager 336 shown in FIG. 4 or RF controller 140 shown in FIG. 5. Program Data 924 includes communication channel performance criteria data 925 that is useful for implementing QoS algorithm 923. In some example embodiments, application 922 can be arranged to operate with program data 924 on an operating system 921 such that implementations of meeting communication channel performance criteria for a WLAN may be provided as described herein. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 960 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. In one example, computing devices 990 may include nodes coupled to a WLAN such as the nodes coupled to WLAN 100 as shown in FIG. 1. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations. Computing device 900 may also be implemented in one of these forms as a CL node, AP node or an RF controller coupled to a WLAN as described in this disclosure.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms may be interpreted broadly. For example, the phrase "coupled to" may refer to being communicatively, electrically and/or operatively coupled as appropriate for the context in which the phrase may be used.

Those skilled in the art will recognize that it is common within the art to describe devices and/or processes in the fashion set forth herein, and thereafter use engineering practices to integrate such described devices (e.g., nodes, RF controller, computing device, etc.) and/or methods into data processing systems. That is, at least a portion of the devices and/or methods described herein may be integrated into a data processing system via a reasonable amount of experimentation. Those having skill in the art may recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It may be understood that such depicted architectures are merely examples, and that in fact many other architectures can be implemented which achieve the same functionality. In a conceptual sense, any arrangement of components to achieve the same functionality may effectively be "associated" such that the desired functionality may be achieved. Hence, any two components herein combined to achieve a particular functionality may be seen as "associated with" each other such that the desired functionality may be achieved, irrespective of architectures or intermedial components. Likewise, any two components so associated can also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as may be appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction may be intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense that one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

What is claimed is:

1. A method for a node achieving quality of service in a wireless local area network (WLAN) via meeting communication channel performance criteria for the WLAN, the method comprising:

obtaining the communication channel performance criteria for the WLAN, the communication channel performance criteria including a minimum signal-to-noise plus interference ratio (SNIR) for receiving data via the communication channel and a proportional fairness limit for nodes coupled to the WLAN to use the communication channel;

adapting a carrier sense threshold for the node responsive to initiation of a first timing interval, adapting the carrier sense threshold to include:

measuring a received signal strength from one or more neighboring nodes coupled to the WLAN;

determining a SNIR for the node to receive data via the communication channel based on the received signal strength and comparing the determined SNIR with the minimum SNIR;

exchanging with the one or more neighboring nodes information associated with comparing the determined SNIR with the minimum SNIR, the exchanged information including an indication from the one or more neighboring nodes that co-use of the communication channel by the node causes the one or more neighboring nodes to fail to meet the minimum SNIR for receiving data via the co-used communication channel; and adjusting a value for the carrier sense threshold based on the exchanged information;

and adapting a minimum contention window responsive to initiation of a second time interval, wherein adapting the minimum contention window includes adapting the minimum contention window based on the proportional fairness limit for nodes coupled to the WLAN to use the communication channel.

2. A method according to claim 1, wherein adapting the minimum contention window comprises adapting the minimum contention window to include a period of time during the second time interval that prevents the node from transmitting data if a detected received signal strength value exceeds the adjusted value for the carrier sense threshold.

3. A method according to claim 1, further comprising the second time interval including at least two subintervals, each subinterval to maintain a given minimum contention window for a period of time, wherein the given minimum contention window for a first subinterval of the at least two subintervals is the minimum contention window adapted in response to initiation of the second time interval.

4. A method according to claim 3, further comprising the at least two subintervals including the first subinterval and a subsequent subinterval, wherein responsive to initiation of the subsequent subinterval, another minimum contention window is adapted based on the proportional fairness limit.

5. A method according to claim 1, wherein the proportional fairness limit comprises the proportional fairness limit determined based on a bandwidth capability of the node as compared to one or more other nodes coupled to the WLAN to use the communication channel, the bandwidth capability to include a data rate at which the node can transmit or receive data via the communication channel with an acceptable error rate.

6. A method according to claim 1, wherein obtaining communication channel performance criteria comprises obtaining communication channel performance criteria from a radio frequency controller coupled to the WLAN.

7. A method according to claim 6, wherein the radio frequency controller initiates the first time interval and the second time interval and reinitiates the first time interval and the second time interval based on an update to the communication channel performance criteria.

8. A method according to claim 1, wherein measuring the received signal strength from one or more neighboring nodes coupled to the WLAN comprises measuring the received signal strength via one or more beacon packets forwarded from the one or more neighboring nodes.

9. A method according to claim 1, wherein measuring the received signal strength from one or more neighboring nodes coupled to the WLAN includes lowering the carrier sense threshold for the node to a default value, the default value based on a noise power level generated by circuitry resident on the node.

10. A method according to claim 9, wherein measuring the received signal strength from one or more neighboring nodes coupled to the WLAN further includes lowering a receiver threshold for the node to the default value and adjusting a value for the receiver threshold based on the determined SNIR for the node to receive data via the communication channel.

11. An apparatus for achieving quality of service in a wireless local area network (WLAN) via meeting communication channel performance criteria for the WLAN, the apparatus comprising:

a media access controller for a node coupled to the WLAN via a communication channel, the media access controller including an adaptation manager having logic to:

obtain the communication channel performance criteria for the WLAN, the communication channel performance criteria including a minimum signal-to-noise plus interference ratio (SNIR) for receiving data via the communication channel and a proportional fairness limit for nodes coupled to the WLAN to use the communication channel;

adapt a carrier sense threshold for the node responsive to initiation of a first timing interval, to adapt the carrier sense threshold to include the logic to:

measure a received signal strength from one or more neighboring nodes coupled to the WLAN;

determine a SNIR for the node to receive data via the communication channel based on the measured received signal strength and comparing the determined SNIR with the minimum SNIR;

exchange with the one or more neighboring nodes information associated with comparing the determined SNIR with the minimum SNIR, the exchanged information including an indication from the one or more neighboring nodes that co-use of the communication channel by the node causes the one or more neighboring nodes to fail to meet the minimum SNIR for receiving data via the co-used communication channel; and adjust a value for the carrier sense threshold based on the exchanged information;

and adapt a minimum contention window responsive to initiation of a second time interval, wherein to adapt the minimum contention window includes to adapt the minimum contention window based on the proportional fairness limit for nodes coupled to the WLAN to use the communication channel.

12. An apparatus according to claim 11, wherein to adapt the minimum contention window comprises to adapt the minimum contention window to include a period of time during the second time interval that prevents the node from transmitting data if a detected received signal strength value exceeds the adjusted value for the carrier sense threshold.

13. An apparatus according to claim 11, further comprising the second time interval including at least two subintervals, each subinterval to maintain a given minimum contention window for a period of time, wherein the given minimum contention window for a first subinterval of the at least two subintervals is the minimum contention window adapted in response to initiation of the second time interval.

14. An apparatus according to claim 13, further comprising the at least two subintervals including the first subinterval and a subsequent subinterval, wherein responsive to initiation of the subsequent subinterval, another minimum contention window is to be adapted based on the proportional fairness limit.

15. An apparatus according to claim 11, wherein the proportional fairness limit comprises the proportional fairness limit determined based on a bandwidth capability of the node as compared to one or more other nodes coupled to the WLAN to use the communication channel, the bandwidth capability to include a data rate at which the node can transmit or receive data via the communication channel with an acceptable error rate.

16. An apparatus according to claim 11, wherein to obtain communication channel performance criteria comprises to obtain communication channel performance criteria from a radio frequency controller coupled to the WLAN.

17. An apparatus according to claim 16, wherein the radio frequency controller initiates the first time interval and the second time interval and reinitiates the first time interval and the second time interval based on an update to the communication channel performance criteria.

18. An apparatus according to claim 11, wherein to measure the received signal strength from one or more neighboring nodes coupled to the WLAN includes the logic to cause the carrier sense threshold for the node to be lowered to a default value, the default value based on a noise power level generated by circuitry resident on the node.

19. An apparatus according to claim 18, wherein to measure the received signal strength from one or more neighboring nodes coupled to the WLAN further includes the logic to cause a receiver threshold for the node to be lowered to the default value and to cause the node to adjust a value for the receiver threshold based on the determined SNIR for the node to receive data via the communication channel.

20. A system for achieving quality of service in a wireless local area network (WLAN) via meeting communication channel performance criteria for the WLAN, the system comprising:
a radio frequency controller for the WLAN, the radio frequency controller having logic to distribute the communication channel performance criteria to nodes coupled to the WLAN, the communication channel performance criteria to include a minimum signal-to-noise plus interference ratio (SNIR) for the communication channel and a proportional fairness limit for the nodes to use the communication channel; and
a node from among the nodes, the node including a media access controller, the media access controller including an adaptation manager having logic to:
obtain the communication channel performance criteria;
adapt a carrier sense threshold for the node responsive to initiation of a first timing interval, to adapt the carrier sense threshold to include the logic to:
measure a received signal strength from one or more neighboring nodes coupled to the WLAN;
determine a SNIR for the node to receive data via the communication channel based on the measured received signal strength and comparing the determined SNIR with the minimum SNIR;
exchange with the one or more neighboring nodes information associated with comparing the determined SNIR with the minimum SNIR, the exchanged information including an indication from the one or more neighboring nodes that co-use of the communication channel by the node causes the one or more neighboring nodes to fail to meet the minimum SNIR for receiving data via the co-used communication channel; and
adjust a value for the carrier sense threshold based on the exchanged information;
and
adapt a minimum contention window responsive to initiation of a second time interval, wherein to adapt the minimum contention window includes to adapt the minimum contention window based on the proportional fairness limit for nodes coupled to the WLAN to use the communication channel.

21. A system according to claim 20, further comprising:
an access point node from among the nodes coupled to the WLAN, the access point node to forward the communication channel criteria distributed by the radio frequency controller to the node including the media access controller.

22. A system according to claim 20, wherein to adapt the minimum contention window comprises to adapt the minimum contention window to include a period of time during the second time interval that prevents the node from transmitting data if a detected received signal strength value exceeds the adjusted value for the carrier sense threshold.

23. A system according to claim 20, wherein to adapt the minimum contention window based on the proportional fairness limit comprises to adapt the minimum contention window based on a bandwidth capability of the node as compared to an average bandwidth capability for the nodes coupled to the WLAN such that the minimum contention window for the node is adapted to a time period based on the comparison, the bandwidth capability to include a data rate at which the node can transmit or receive data via the communication channel with an acceptable error rate.

24. A system according to claim 20, wherein the radio frequency controller initiates the first time interval and the second time interval and reinitiates the first time interval and the second time interval based on an update to the communication channel performance criteria.

25. A computer program product comprising a non-transitory signal bearing medium having instructions for achieving quality of service in a wireless local area network (WLAN) via meeting communication channel performance criteria for the WLAN, which, when executed by logic included in a node coupled to the WLAN, cause the logic to:
obtain the communication channel performance criteria for the WLAN, the communication channel performance criteria including a minimum signal-to-noise plus interference ratio (SNIR) for receiving data via the communication channel and a proportional fairness limit for nodes coupled to the WLAN to use the communication channel;
adapt a carrier sense threshold responsive to initiation of a first timing interval, to adapt the carrier sense threshold to include:
measuring a received signal strength from one or more neighboring nodes coupled to the WLAN;
determining a SNIR for the node to receive data via the communication channel based on the measured received signal strength and comparing the determined SNIR with the minimum SNIR;
exchanging with the one or more neighboring nodes information associated with comparing the determined SNIR with the minimum SNIR, the exchanged information including an indication from the one or more neighboring nodes that co-use of the communication channel by the node causes the one or more neighboring nodes to fail to meet the minimum SNIR for receiving data via the co-used communication channel; and
adjusting a value for the carrier sense threshold based on the exchanged information;
and
adapt a minimum contention window responsive to initiation of a second time interval, wherein to adapt the minimum contention window includes adapting the minimum contention window based on the proportional fairness limit for nodes coupled to the WLAN to use the communication channel.

26. A computer program product according to claim 25, wherein to adapt the minimum contention window comprises to adapt the minimum contention window to include a period of time during the second time interval that prevents the node from transmitting data if a detected received signal strength value exceeds the value for the adjusted carrier sense threshold.

27. A computer program product according to claim 25, wherein the proportional fairness limit comprises the proportional fairness limit determined based on a bandwidth capability of the node as compared to one or more other nodes coupled to the WLAN to use the communication channel, the bandwidth capability to include a data rate at which the node can transmit or receive data via the communication channel with an acceptable error rate.

28. A method for a node achieving quality of service in a wireless local area network (WLAN) via meeting communication channel performance criteria for the WLAN, the method comprising:

obtaining the communication channel performance criteria for the WLAN, the communication channel performance criteria including a minimum signal-to-noise plus interference ratio (SNIR) for receiving data via the communication channel and a proportional fairness limit for nodes coupled to the WLAN to use the communication channel;

adapting a carrier sense threshold for the node responsive to initiation of a first timing interval, adapting the carrier sense threshold to include:

measuring a received signal strength from one or more neighboring nodes coupled to the WLAN;

determining a SNIR for the node to receive data via the communication channel based on the received signal strength and comparing the determined SNIR with the minimum SNIR;

exchanging with the one or more neighboring nodes information associated with comparing the determined SNIR with the minimum SNIR; and adjusting a value for the carrier sense threshold based on the exchanged information;

and adapting a minimum contention window responsive to initiation of a second time interval, the second time interval including at least two subintervals, each subinterval to maintain a given minimum contention window for a period of time, the given minimum contention window for a first subinterval of the at least two subintervals is the minimum contention window adapted in response to initiation of the second time interval, wherein adapting the minimum contention window includes adapting the minimum contention window based on the proportional fairness limit for nodes coupled to the WLAN to use the communication channel.

29. A method according to claim 28, further comprising the at least two subintervals including the first subinterval and a subsequent subinterval, wherein responsive to initiation of the subsequent subinterval, another minimum contention window is adapted based on the proportional fairness limit.

30. A method according to claim 28, wherein adapting the minimum contention window comprises adapting the minimum contention window to include a period of time during the second time interval that prevents the node from transmitting data if a detected received signal strength value exceeds the adjusted value for the carrier sense threshold.

31. A method according to claim 28, wherein the proportional fairness limit comprises the proportional fairness limit determined based on a bandwidth capability of the node as compared to one or more other nodes coupled to the WLAN to use the communication channel, the bandwidth capability to include a data rate at which the node can transmit or receive data via the communication channel with an acceptable error rate.

* * * * *

UNITED STATES PATENT AND TRADEMARK OFFICE
CERTIFICATE OF CORRECTION

PATENT NO. : 8,144,613 B2
APPLICATION NO. : 12/467919
DATED : March 27, 2012
INVENTOR(S) : Roy et al.

It is certified that error appears in the above-identified patent and that said Letters Patent is hereby corrected as shown below:

Title Page 2, in item (56), under "OTHER PUBLICATIONS", in Column 1, Line 5, delete "Tarun Josh," and insert -- Tarun Joshi, --, therefor.

Signed and Sealed this
Fourth Day of June, 2013

Teresa Stanek Rea
*Acting Director of the United States Patent and Trademark Office*